(12) United States Patent
Barnett (10) Patent No.: US 6,354,973 B1
(45) Date of Patent: Mar. 12, 2002

(54) CHAIN GUIDE APPARATUS FOR BICYCLE

(76) Inventor: Robert L. Barnett, 2090 Meyer Pl., Costa Mesa, CA (US) 92627

( * ) Notice: Subject to any disclaimer, the term of this patent is extended or adjusted under 35 U.S.C. 154(b) by 0 days.

(21) Appl. No.: 09/441,727

(22) Filed: Nov. 16, 1999

(51) Int. Cl.$^7$ .............................. F16H 7/08; F16H 7/22; B62J 13/00
(52) U.S. Cl. ...................... 474/140; 474/111; 474/101; 474/144
(58) Field of Search .................... 474/101, 111, 474/140, 117, 139, 133–135, 137, 138, 144, 146

(56) References Cited

U.S. PATENT DOCUMENTS

| | | | | |
|---|---|---|---|---|
| 3,869,138 A | * | 3/1975 | Allison | 474/111 X |
| 4,498,890 A | * | 2/1985 | Sutherland | 474/140 |
| 4,662,862 A | * | 5/1987 | Matson | 474/111 X |
| 5,320,582 A | * | 6/1994 | Takeda | 474/140 |
| 6,083,132 A | * | 7/2000 | Walker | 474/111 |

* cited by examiner

Primary Examiner—David A. Bucci
Assistant Examiner—Marcus Charles
(74) Attorney, Agent, or Firm—Roy A. Ekstrand (57) ABSTRACT

A bicycle includes a conventional pedal crank and chain drive together with a conventional derailleur shifting mechanism operative to selectively transfer the drive chain between alternative rear sprockets of the bicycle drive system. A chain ring is rotatable in response to pedal crank rotation to transfer pedal crank power to the rear sprockets. A pair of guide blocks define respective internal guide channels through which the drive chain passes toward and from engagement with the chain ring. The guide blocks are maintained at their respective positions by a guide support plate secured to the bicycle frame.

7 Claims, 5 Drawing Sheets

CHAIN GUIDE APPARATUS FOR BICYCLE

FIELD OF THE INVENTION

This invention relates generally to bicycles and particularly to those having multiple sprocket chain drive systems used in off-road or mountain biking.

BACKGROUND OF THE INVENTION

The sport of cycling has proven to be an extremely popular and long lasting sport and recreational activity. Through the years, a variety of cycling or biking activities have been pursued by a wide range of participants. Not surprisingly, participants in the various cycling or biking activities and recreations have been operative in a variety of environmental circumstances ranging from high speed competition to slow and casual pleasure riding or cycling. In recent years an interesting type of cycling has emerged which is generally referred to as off-road biking or mountain biking. In this sport activity, participants often ride over extremely rough terrain and challenging hill and mountain trails. This activity subjects the bicycle and its operative apparatus to extremes in stress, loading and impact. To meet the need for bicycles capable of operating in such high stress and high load environments over such challenging terrain, practitioner's in the art have endeavored to provide bicycles which are extremely strong and durable. A competing interest in the production of such strong and durable bicycles is the concurrent need to maintain a substantially light-weight bicycle in order to reduce the energy required to pedal such bicycles across the often hilly and challenging terrain. Toward this end, the typical off-road bicycle utilizes an extremely light-weight frame often fabricated from light-weight exotic metals such as titanium, aluminum and magnesium as well as various high strength alloys thereof. To improve the impact or shock absorption characteristic required to assure sufficient durability and strength of such off-road bicycles, the frame is often fabricated of a plurality of frame portions coupled together using a variety of spring loaded and shock absorbing suspension components. The objective is to provide a frame capable of absorbing substantial impact shock while reducing the energy imparted to the frame through multiply articulated shock absorbing suspension components. The overall objective is to of coarse to avoid damage to the light-weight high-strength frame.

Most off-road bicycles utilize chain drive apparatus in which a plurality of varying diameter sprockets are grouped at the rear wheel and are driven by a pedal crank and chain sprocket drive mechanism. A variety of gear ratios or drive ratios are obtained by the use of a chain derailleur mechanism which is operative to transfer the power coupling chain between the various drive sprockets. In this way, the overall drive ration between the crank and the rear wheel may be varied to allow the user to address different terrain conditions.

While the multiple sprocket train drive systems in use have been refined to provide extremely effective operation and a wide range of drive ratios to a aid the cyclist introverting challenging hills and trails, a problem often arises due to the combined effect of the flexing shock-absorbing frame and the chain drive system. This problem is known generally as "chain-whipping" and arises as the articulated frame portions flex to absorb impact and as the loading upon the chain drive is varied in different circumstances. The end result is the creation of undesired slack within the drive chain allowing the upper and lower spans of the drive chain to whip up and down and disengage from the front drive sprocket. Drive chain whipping action is more severe in the upper span of the drive chain (the portion between the rear sprocket and the upper edge of the chain ring) than in the lower span of the drive chain (the portion between the rear sprocket and the lower edge of the chain ring). This results from the tendency of the derailleur mechanism to maintain greater tension in the lower span.

Drive chain engagement can be extremely vexing to a cyclist and under competitive conditions can cause the cyclist to loose his or her ability to effectively compete. Typically, once the drive chain has disengaged from the front sprocket, the cyclist is required to stop and reset the chain upon the sprockets before continuing. In addition, the sudden release of resisting load caused by the chain skipping from the drive socket also creates the possibility of injury to the rider.

In attempting to address the problems associated with disengagement of the drive chain from the front drive sprocket, practitioner's have attempted to provide bicycle chain drives such as that set forth in U.S. Pat. No. 5,460,576 issued to Barnett which sets forth a BICYCLE CHAIN GUIDE secured to the front hub portion of an otherwise conventional bicycle having a multiple speed chain drive and plural front sprocket coupled to a pedal crank. The bicycle chain guide is pivotally secured beneath the front hub and defines a plurality of staggered step portions corresponding generally to the outer diameters of the plural front sprockets. Sufficient clearance is provided between the step portions and the front sprockets to avoid rubbing against the chain engaged with one of the sprockets. In the event a chain-whipping motion or wave is imparted to the bicycle chain, the step portions of the chain guide captivate the chain against the engaged sprocket to prevent separation thereof.

There arises therefore, a continuing need in the art for evermore improved chain drive systems for bicycles. In particular, there arises a continuing need in the art for systems and apparatus which minimize the effect of chain-whipping in bicycles used under off-road or mountain biking conditions.

SUMMARY OF THE INVENTION

Accordingly, it is a general object of the present invention to provide an improved chain drive system for bicycles. It is a more particular object of the present invention to provide an improved chain drive system for bicycles in which the problems of chain-whipping at the front drive sprocket are substantial reduced or eliminated.

In accordance with the present invention there is provided a chain guide apparatus for use in combination with a bicycle drive system having a pedal crank, a chain ring rotated thereby, a frame supporting the pedal crank and a drive chain engaging the chain ring, the chain guide apparatus comprising: a guide support plate and means for supporting the guide support plate upon a bicycle frame and pedal crank; an upper guide block supported by the guide support plate and having a first guide channel formed therein for receiving a bicycle drive chain; and a lower guide block supported by the guide support plate and a second guide channel formed therein for receiving a bicycle drive chain, the upper guide block guiding the bicycle drive chain toward the bicycle chain ring and the lower guide block guiding the bicycle drive chain away from the bicycle chain ring, the upper and lower guide blocks maintaining drive chain engagement despite chain-whipping forces.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which;

DESCRIPTION OF THE PREFERRED EMBODIMENT

Figure 1:
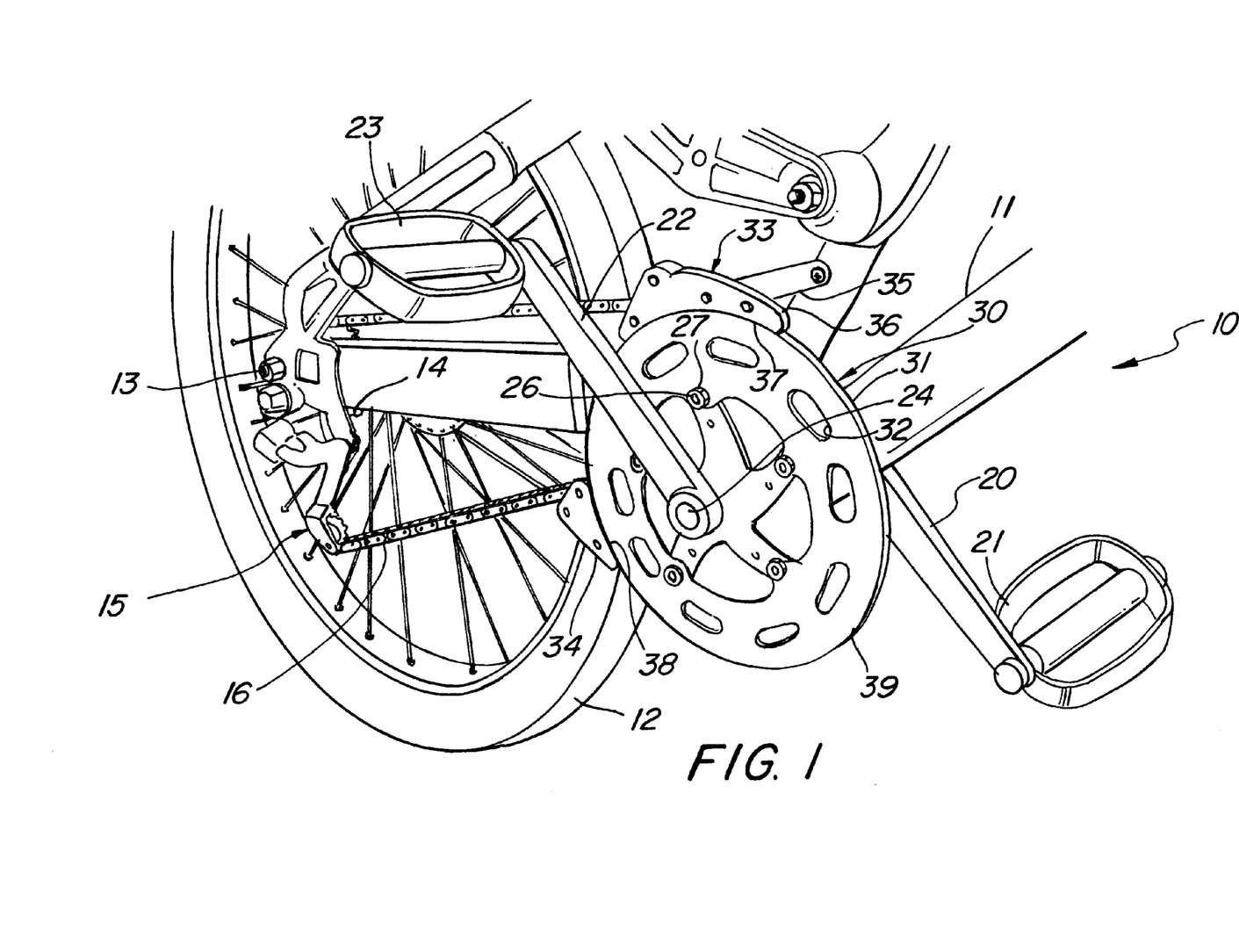
FIG. 1 sets forth a perspective view of a bicycle chain drive system constructed in accordance with the present invention supported upon a typical bicycle.

FIG. 1 sets forth a perspective view of a chain guide apparatus constructed in accordance with the present invention and generally referenced by numeral 10 which is supported upon an otherwise conventional bicycle generally referenced by numeral 10. Bicycle 10 is an otherwise conventional off-road or mountain bike an thus includes a light-weight frame 11 supporting a conventional pair of pedal cranks 20 and 22 having a pedal crank shaft 24 extending therebetween. In further accordance with conventional fabrication techniques, frame 11 of bicycle 10 supports a bottom bracket (not shown) which rotatably supports pedal crank shaft 24 in further accordance with conventional fabrication techniques. In further accordance with conventional fabrication bicycle 10 includes a rear wheel 12 rotatably supported by frame 11 utilizing a rear axle 13. A conventional derailleur 15 is supported proximate to axle 13 upon frame 11. While not seen in FIG. 1, it will be understood that frame 11 supports conventional pedal crank bearings for rotatably supporting pedal crank shaft 24 to facilitate rotation of pedal crank shaft 24 as pedal cranks 20 and 22 are rotated by the riders force applied to pedals 21 and 23 thereof.

A generally star shaped spider 25 is coupled to pedal crank shaft 24 by conventional attachment means (not shown) and is rotatable with pedal crank shaft 24. A generally planar annular bash ring 31 defines an outer edge 39 together with a plurality of arcuate mud slots 32. A plurality of fasteners 26 and threaded nuts 27 cooperate to secure spider 25 to bash ring 31. Accordingly, bash ring 31 is supported by spider 25 and is rotatable in combination therewith as pedal cranks 20 and 22 are rotated. As is better seen in FIG. 3, a chain ring 70 is also secured to spider 25 and defines a plurality of teeth 71.

Returning to FIG. 1, a drive chain 16 fabricated in accordance with conventional fabrication techniques is received upon a rear sprocket 14 of rear wheel 12 and is further guided by derailleur 15. Drive chain 16 further passes upon chain ring 70 (seen in FIG. 3) and thereby engages the chain ring. While not seen in FIG. 1, it will be understood that sprocket 14 is one of several differently sized sprockets supported upon axle 13 which are selectively engaged by drive chain 16 through the action of derailleur 15. The operation of derailleur 15 and the plurality of sprockets upon rear wheel 12 and axle 13 operate in accordance with conventional fabrication techniques to provide variation of drive or gear ratio for the rider of bicycle 10.

In accordance with the present invention, a guide support plate 40 (better seen in FIG. 4) is secured to frame 11 by conventional attachment (not seen in FIG. 1) and supports an upper guide block 33 and a lower guide block 34. In further accordance with the present invention, upper guide block 33 and lower guide block 34 define respective internal guide channels 60 and 63 (seen in FIG. 3) through which drive chain 16 passes as it engages chain ring 70 (seen in FIG. 3). In further accordance with the present invention, upper guide block 33 and lower guide block 34 are positioned with respect to bash ring 31 and chain ring 70 (seen in FIG. 3) to maintain drive chain 16 in engagement with chain ring 70 despite the above described chain-whipping forces which bicycle 10 may encounter during off-road or mountain biking activities. In further accordance with the present invention, upper guide block 33 defines an elongated generally curved extended ramp portion 36 having an arcuate edge 37 which is positioned close to edge 39 of bash ring 31. The position of extended ramp 36 and particularly edge 37 thereof, further maintains the proper position of drive chain 16 during the various whipping forces which bicycle 10 may induce during riding activities. Similarly, the position of lower guide block 34 is selected to position edge 38 proximate to edge 39 of bash ring 31 to further guide and maintain the position of drive chain 16. A brace 35 secures upper guide block 33 to frame 11 to further stabilize guide support plate 40.

In operation, as the user rotates pedal cranks 20 and 22 by foot pressure applied to pedals 21 and 23, pedal crank shaft 24 is rotated. The rotation of pedal shaft 24 rotates spider 25 which in turn rotates bash ring 31 and chain ring 70 (seen in FIG. 3). The rotation of chain ring 70 moves drive chain 16 which in turn rotates the engaged sprocket of rear wheel 12 such as sprocket 14 to propel bicycle 10. In accordance with the anticipated activities to which bicycle 10 is subjected in off-road or mountain biking, the movement of articulated suspension members coupled to frame 11 which support rear wheel 12 as well as the action of derailleur 15 may produce the above described chain-whipping action by drive chain 16. The chain-whipping actions of drive chain 16 would but for the operation of upper guide block 33 and lower guide block 34 of chain guide 30 have a tendency to disengage drive chain 16 from chain ring 70 (seen in FIG. 3). The operation of upper guide block 33 and lower guide block 34 however, prevents the disengagement of drive chain 16 due to the restrictive movement allowed by the guide blocks upon chain 16 as it passes through the internal guide channels.

Figure 3:
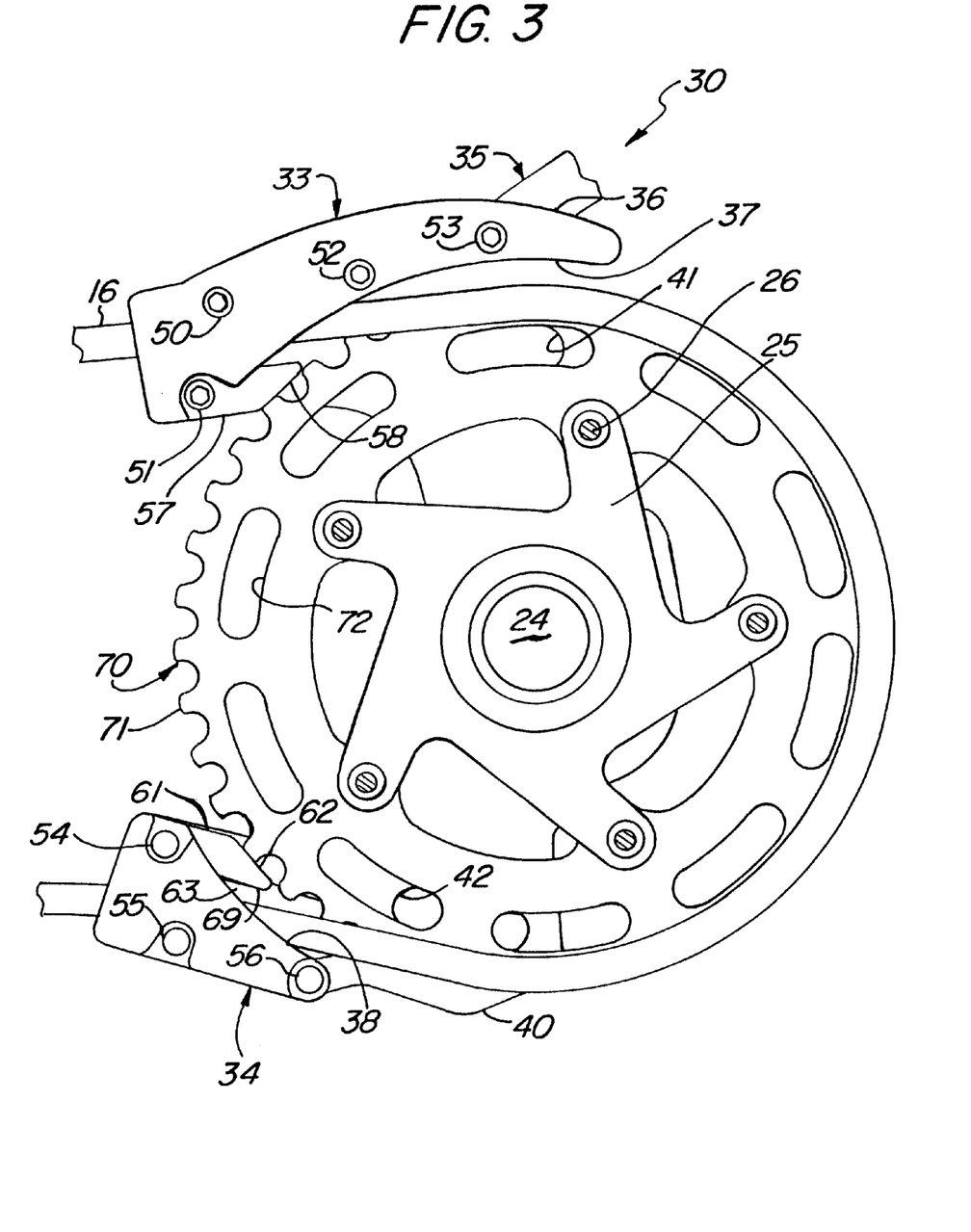
FIG. 3 sets forth a side elevation view of the drive apparatus of FIG. 2 having the pedal crank and bash ring removed.

In accordance with a further advantage of the present invention chain guide apparatus, bash ring 31 and chain ring 70 (seen in FIG. 3) are provided with a plurality of mud slots 32 and 72 (seen in FIG. 3). The position of the mud slots within bash ring 31 and chain ring 70 facilitate the clearance of mud and other debris which may be picked up by drive chain 16 during operation upon muddy trails or terrain. Under normal circumstances, accumulated mud carried by drive chain 16 which becomes enmeshed in the chain drive apparatus of bicycle 10 is squeezed outwardly through mud slots within bash ring 31 and chain ring 70 (seen in FIG. 3). The operation of the mud slots within bash ring 31 and chain ring 70 allows this mud to clear out from the chain and sprocket mechanism and thereby maintains proper operation of bicycle 10.

As is better set forth below in greater detail, the preferred fabrication of upper guide block 33 and lower guide block 34 utilizes a pair of generally mirror-image portions which are secured together using a plurality of fasteners. In further accordance with the preferred fabrication of the present invention, the mirror-image portions of guide blocks 33 and 34 are fabricated of a high-strength plastic or composite polymer material. It will be apparent to those skilled in the art however, that other materials and other fabrications may be used without departing from the spirit and scope of the present invention.

Figure 2:
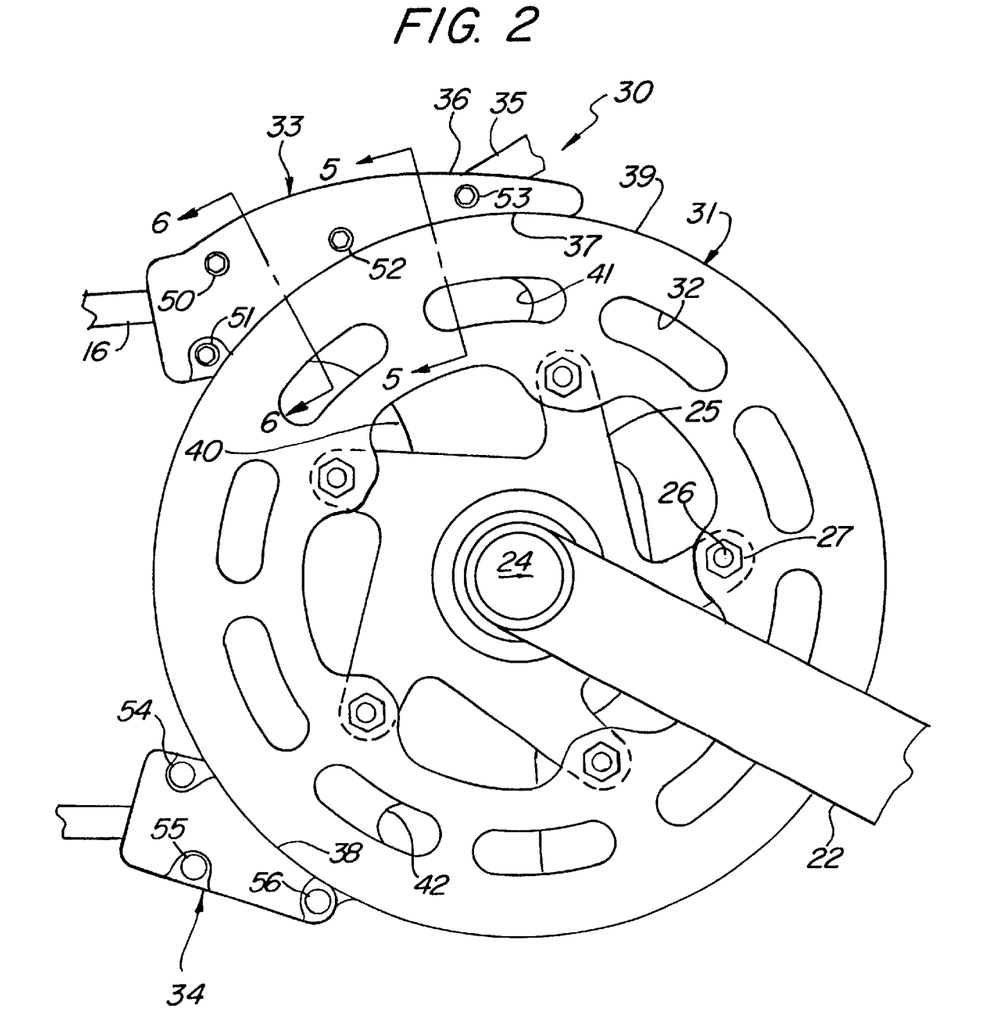
FIG. 2 sets forth a side elevation view of the present invention chain guide apparatus upon a typical bicycle chain drive.

FIG. 2 sets forth a side elevation view of chain guide apparatus 30 in a typical assembly upon a conventional pedal crank bicycle mechanism. As described above, a pedal crank shaft 24 supports a pair of pedal cranks 22 and 20 (pedal crank 20 seen in FIG. 1) in a rotatable attachment utilizing conventional fabrication techniques (not shown). Pedal crank shaft 24 supports a spider 25 having a plurality of outwardly extending portions. A bash ring 31 comprising a substantially planar annular member defines a circular outer edge 39 and is secured to the extending portions of spider 25 by a plurality of threaded fasteners 26 and a plurality of cooperating nuts 27. Spider 25 is engaged with pedal crank 24 by conventional attachment means (not shown) and is thus rotatable in combination with pedal crank shaft 24. Bash ring 31 further defines a plurality of arcuate mud slots 32 which are positioned upon bash ring 31 to facilitate the outward movement of mud accumulated within the drive mechanism of the host bicycle utilizing chain guide apparatus 30. As is better seen in FIG. 3, spider 25 also supports a generally annular chain ring 70 having a plurality of teeth 71 extending radially outwardly therefrom. As is also better seen in FIG. 3, a drive chain 16 passes about and engages chain ring 70 through the cooperation of chain 16 and teeth 71.

In accordance with the present invention, chain guide apparatus 30 includes a guide support plate 40 secured to the host bicycle frame in accordance with conventional fabrication techniques (not shown) to provide stationary attachment of guide support plate 40. Guide support plate 40 defines a pair of arcuate mud slots 41 and 42 and further supports an upper guide block 33 and a lower guide block 34. Upper guide block 33 is secured to an supported by guide support plate 40 using a plurality of conventional threaded fasteners 50, 51 and 52. As mentioned above, upper guide block 33 is preferably fabricated of a pair of generally mirror-image portions which are secured together using a plurality of fasteners 50, 51, 52 and 53 to provide the combined structure of upper guide block 33. A brace 35 is secured to upper guide block 33 by fastener 53 and as is better seen in FIG. 1, is further secured to frame 11 of bicycle 10 to stabilize the position of upper guide block 33.

In accordance with the present invention, upper guide block 33 includes a generally curved extended ramp 36 having an arcuate edge 37 formed on the underside thereof. Arcuate edge 37 defines a curvature generally corresponding to edge 39 of bash ring 31. In accordance with the preferred fabrication of the present invention, upper guide block 33 is positioned upon guide support plate 40 to closely space arcuate edge 37 upon edge 39 of bash ring 31.

Figure 4:
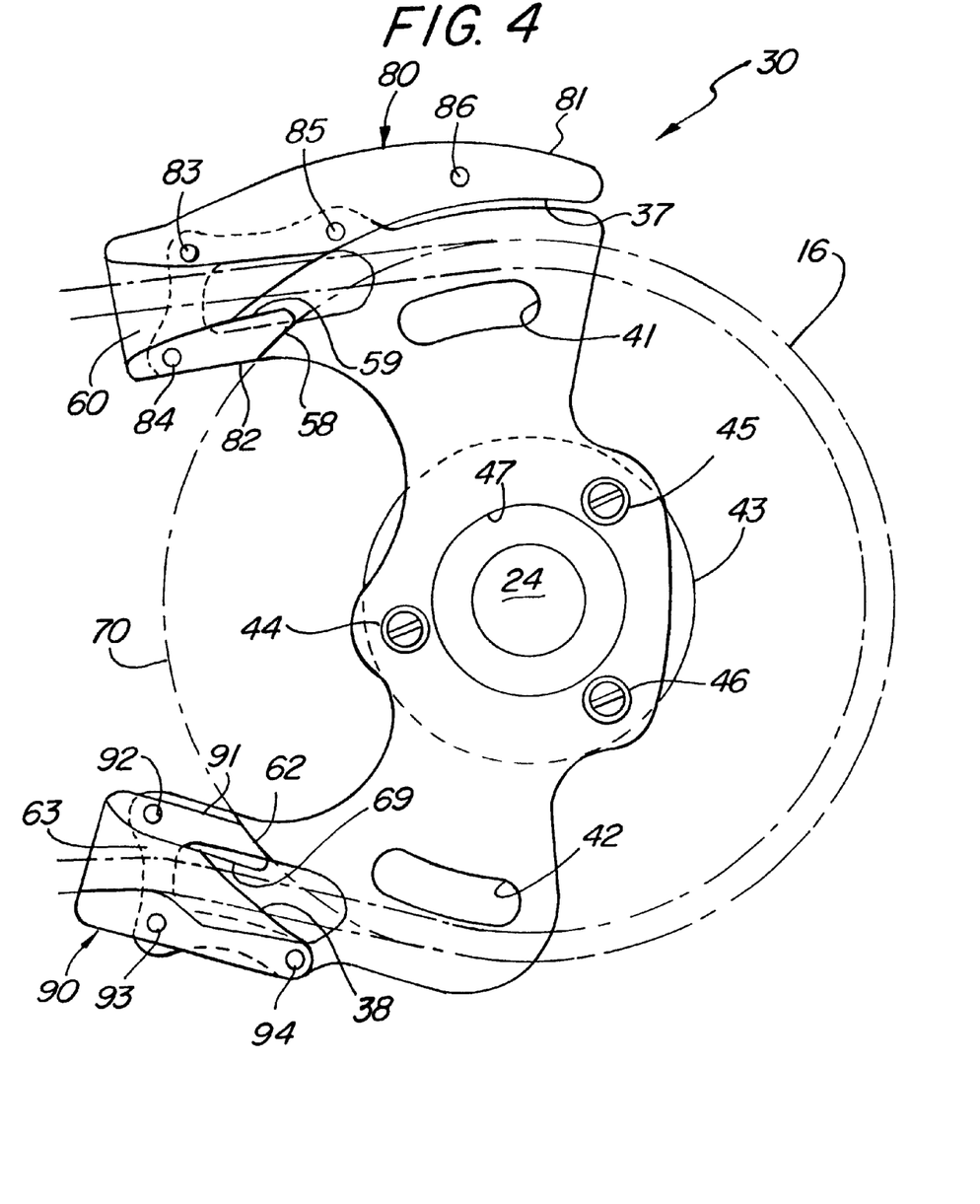
FIG. 4 sets forth the present invention chain guide apparatus together with a phantom outline of a front sprocket and drive chain of a bicycle.

In further accordance with the present invention and as is better seen in FIG. 4, upper guide block 33 defines an internal guide channel 60 through which drive chain 16 is passed. The captivation of drive chain 16 within the internal channel of upper guide 33 maintains the engagement of drive chain 16 upon chain ring 70 (seen in FIG. 3) and resists the above described chain-whipping forces. The close positioning of arcuate edge 37 with respect to edge 39 of bash ring 31 further assures the captivation of drive chain 16.

In further accordance with the present invention, chain guide apparatus 30 includes a lower guide block 34 also preferably formed of generally mirror-image portions which are assembled to form lower guide block 34 by a plurality of fasteners 54, 55 and 56. In similarity to upper guide block 33, lower guide block 34 defines a arcuate edge 38 having a curvature substantially identical to edge 39 of bash ring 31. In further similarity to upper guide block 33, lower guide block 34 defines an internal guide channel 63 (seen in FIG. 4) through which drive chain 16 passes. The close positioning of lower guide block 34 and the captivation of arcuate edge 38 and internal guide channel 63 cooperate to further maintain the proper position and engagement of drive chain 16 upon chain ring 70 (seen in FIG. 3) and resist the above described chain-whipping forces.

FIG. 3 sets forth the side elevation view of chain guide apparatus 30 shown in FIG. 2 having pedal crank 22 and bash ring 31 removed. As described above, pedal crank shaft 24 is rotatably supported upon the host bicycle by conventional means (not shown) and is rotated through the peddling action of the user. As is also described above, spider 25 includes a plurality of outwardly extending members and is secured to pedal crank shaft 24 by conventional means (not shown) to cause spider 25 to be rotatable in combination with pedal crank shaft 24. A substantially annular chain ring 70 defines a plurality of outwardly extending radially spaced sprocket teeth 71 and is secured to spider 25 by a plurality of conventional threaded fasteners 26. Chain ring 70 further defines a plurality of arcuate mud slots 72 which are positioned in substantial alignment with mud slots 32 of bash ring 31 (seen in FIG. 2). A conventional drive chain 16 fabricated of a plurality of pivotally joined chain links is received upon chain ring 70 and engages teeth 71 to provide operative drive coupling between chain ring 70 and the rear sprockets of the host bicycle in the manner set forth above in FIG. 1.

In further accordance with the present invention chain guide apparatus 30 includes a guide support plate 40 secured to the host bicycle frame by conventional attachment (not shown). Guide support plate 40 defines a pair of arcuate mud slots 41 and 42 generally aligned with mud slots 72 of chain ring 70. Guide support plate 40 further supports an upper guide block 33 and a lower guide block 34. As described above, upper guide block 33 includes an extended ramp 36 and an arcuate edge 37. As is also described above, upper guide block 33 is joined to guide support plate 40 by a plurality of fasteners 50, 51 and 52. Fastener 53 provides attachment between the mirror-image portions of upper guide block 33. Fastener 53 provides further attachment to brace 35 which in turn is secured to frame 11 in the manner seen in FIG. 1 to further stabilize the position of upper guide block 33. As is better seen in FIG. 4, upper guide block 33 defines an internal guide channel 60 through which drive chain 16 passes. In addition, upper guide block 33 further defines a forwardly extending guide finger 57 which in turn defines a support ramp 59 and an arcuate edge 58. Support ramp 59 of guide finger 57 provides a further captivating surface for drive chain 16 which supports drive chain 16 between guide channel 60 and chain ring 70. Arcuate edge 58 is positioned close to the extension of teeth 71 to further guide drive chain 16 in its engagement of chain ring 70.

Lower guide block 34 is secured to guide support plate 40 by a plurality of fasteners 54, 55 and 56. As described above, lower guide block 34 defines an arcuate edge 38 and an internal guide channel 63 (seen in FIG. 4). Drive chain 16 passes through the internal channel of lower guide block 34. Arcuate edge 38 cooperates with bash ring 31 (seen in FIG. 2) to further captivate drive chain 16 and resist chain-whipping forces within the drive chain. In further accordance with the present invention, lower guide block 34 includes a forwardly extending guide finger 61 which in turn defines a support ramp 69 and an arcuate edge 62. Support ramp 69 is positioned to further guide chain 16 as it spans the space between chain ring 70 and channel 63 of lower guide block 34.

Support ramps 59 and 69 operate to ensure that guide chain 16 does not get carried downwardly from upper guide block 33 during reverse direction pedal rotation nor upwardly from lower guide block 34 during forward direction pedal rotation. This prevents drive chain 16 from getting jammed in teeth 71 of chain ring 70.

During off-road bicycle riding, riders pedal forwardly to increase speed and/or apply power to the rear wheel. Riders may choose to pedal in the reverse direction through partial rotation movements to align the pedal cranks in a generally horizontal position to maximize ground clearance. Thus, riders may need to rapidly switch between forward and reverse directions of pedal rotation increasing the likelihood of chain-whipping and chain-jamming problems which the present invention chain guide apparatus prevents.

FIG. 4 sets forth chain guide apparatus 30 having the outer portions of upper guide block 33 and lower guide block 34 removed to reveal the shape and structure of interior guide channels 60 and 63 respectively. For purposes of illustration, drive chain 16 and chain ring 70 are shown in phantom line representation upon chain guide apparatus 30.

Chain guide apparatus 30 includes a guide support plate 40 formed of a ridged planar material such as aluminum or the like. Guide support plate 40 is secured to the host bicycle by attachment to a mount ring 43 which in accordance with conventional fabrication techniques is secured to the bottom bracket of a host bicycle (not shown). A plurality of threaded fasteners 44, 45 and 46 are used in securing guide support plate 40 to mount ring 43. Thus, guide support plate 40 is secured in a fixed position upon the host bicycle. Guide support plate 40 further defines an aperture 47 through which pedal crank shaft 24 passes together with a pair of arcuate mud slots 41 and 42.

In accordance with the preferred fabrication of the present invention, upper guide block 33 and lower guide block 34 (seen in FIG. 3) are preferably formed of substantially mirror-image portions which are secured together by pluralities of fasteners to form guide blocks 33 and 34. For purposes of illustration, the outer guide block portions of upper guide block 33 and lower guide block 34 have been removed in FIG. 4. This is believed to provide the best drawing figure for describing the internal guide channels of guide blocks 33 and 34 and there interaction with drive chain 16. Thus, guide block portion 80 of upper guide block 33 is shown in FIG. 4 upon guide support plate 40 while guide block portion 90 of lower guide block 34 is similarly shown upon guide support plate 40.

Guide block portion 80 defines a generally curved ramp portion 81 having an arcuate edge 37 formed thereon. Guide block portion 80 further defines a plurality of apertures 83, 84, 85 and 86. An internal guide channel 60 having a guide channel roof surface 49 is formed within guide block portion 80 through which drive chain 16 passes. Guide block portion 80 further includes a finger guide portion 82 having a support ramp 59 and an arcuate edge 58 formed thereon. Edge 58 is positioned in close proximity to chain ring 70 in the manner seen in FIG. 3. Arcuate edge 37 is positioned proximate to edge 39 of bash ring 31 in the manner seen in FIG. 2. It will be understood that the mirror-image portion of upper guide block 33 (guide block portion 100 seen in FIG. 5) is substantially mirror-image formed to guide block portion 80 and thus defines a substantially mirror-image shape to complete guide channel 60 and enclose drive chain 16 as it passes through upper guide block 33 in the manner seen in FIG. 3. Apertures 83, 84 and 85 receive fasteners 50, 51 and 52 respectively to secure guide block portions 100 (seen in FIG. 5) and 80 in there common attachment as well as attachment to guide support plate 40. Aperture 86 receives fastener 53 (seen in FIG. 3) to secure guide block portions 100 and 80 together to secure the assembly of upper guide block 33.

Guide block portion 90 defines a guide channel 63 and a plurality of apertures 92, 93 and 94. Guide block portion 90 further defines an arcuate edge 38 and a fowardly extending finger portion 91. Guide finger portion 91 in turn defines a support ramp 69 and an arcuate edge 62. In a similar manner to the above described fabrication of upper guide block 33, lower guide block 34 (seen in FIG. 3) is formed of substantially mirror-image portions to complete the guide block structure. A guide channel 63 is formed in guide block portion 90 through which drive chain 16 passes.

Figure 5:
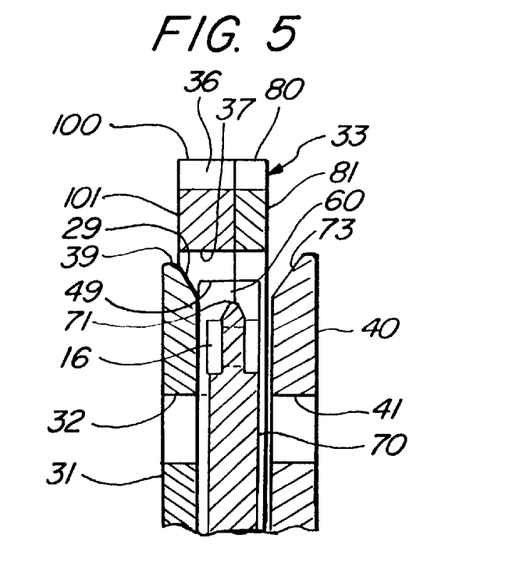
FIG. 5 sets forth a partial section view of the present invention chain guide apparatus taken along section lines 5—5 in FIG. 2.

FIG. 5 sets forth a partial section view of chain guide apparatus 30 taken along section lines 5—5 in FIG. 2. Guide support plate 40 defines a mud slot 41 and an angled surface 73. An upper guide block 33 is formed of a guide block portion 80 and a guide block portion 100 having generally mirror-image shapes. Guide block portions 80 and 100 are commonly joined and secured to guide support plate 40 in the above described manner. Upper guide block 33 defines an extended ramp 33 formed of ramp portions 81 and 101 of guide block portions 80 and 100 respectively. A guide channel 60 having guide channel roof surface 49 is formed within upper guide block 33. An arcuate edge 37 is formed on the underside of extended ramp 36. A chain ring 70 defines a plurality of radially extending teeth 71 and is rotatably supported to engage a drive chain 16. A bash ring 31 having a plurality of mud slots 32 formed therein is rotatable with chain ring 70 and defines an angled surface 29 and an outer edge 39.

In accordance with the preferred fabrication of the present invention, upper guide block 33 is positioned upon guide support plate 40 such that arcuate edge 37 is proximate to edge 39 of bash ring 31.

In operation, drive chain 16 passes through guide channel 60 of upper guide block 33 and engages teeth 71 of chain ring 70. The engagement and position of drive chain 16 upon chain ring 70 is aided and maintained in opposition to the above described chain-whipping forces by the cooperation of guide channel 60 and angled surfaces 73 and 29. In addition, the close positioning of arcuate edge 37 with respect to edge 39 of bash ring 31 an angled surface 73 of guide support plate 40 further captivates and guides drive chain 16 to maintain proper engagement between drive chain 16 and chain ring 70.

Figure 6:
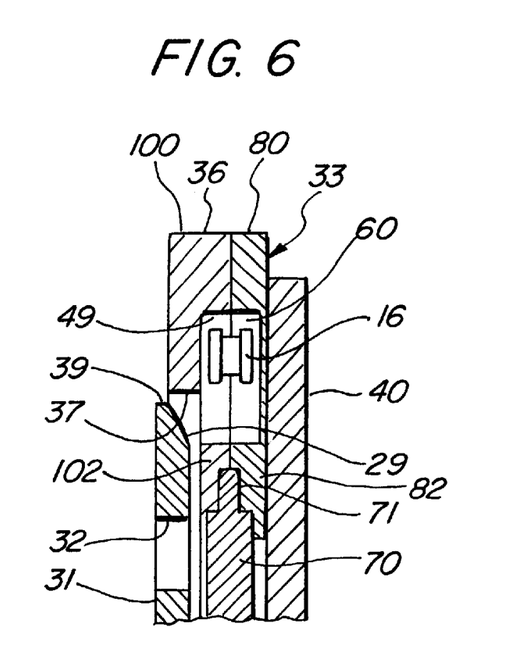
FIG. 6 sets forth a partial section view of the present invention chain guide apparatus taken along section lines 6—6 in FIG. 2.

FIG. 6 sets forth a partial section view of chain guide apparatus 30 taken along section lines 6—6 in FIG. 2. A guide support plate 40 supports an upper guide block 33 formed of a pair of guide block portions 80 and 100. Guide block portions 80 and 100 are generally mirror-image in shape and define a guide channel 60 and guide channel roof surface 49 passing therethrough. A drive chain 16 passes through guide channel 60 in the manner best seen in FIG. 3. As described above, guide block portions 80 and 100 are commonly joined and secured to guide support plate 40 by a plurality of fasteners in the manner best seen in FIG. 3. Guide block portion 80 further defines a finger portion 82 while guide block portion 100 defines a mirror-image finger portion 102. In combination, portions 82 and 102 form a guide finger 57 (seen in FIG. 3). A chain ring 70 having a plurality of radially extending teeth 71 is rotatably supported along side guide support plate 40. A bash ring 31 is rotatable in combination with chain ring 70 as described above and defines an outer edge 39, an angled surface 29 and a mud slot 32. Guide block portion 100 defines an arcuate edge 37 which is positioned in close proximity to edge 39 of bash ring 31.

In the section view shown in FIG. 6, drive chain 16 extends through channel 60 and is maintained in general alignment with teeth 71 of chain ring 70 by the cooperation of channel 60 together with guide support plate 40 and bash ring 31.

What has been shown is a chain guide apparatus which utilizes a guide support plate supporting a pair of guide blocks positioned with respect to a chain ring and drive chain to resist disengagement of the drive chain from the chain ring due to chain-whipping forces commonly encountered in off-road and mountain bike activities. Each guide block defines an internal guide channel through which the guide chain passes and within which the drive chain is captivated to restrict its movement in response to chain-whipping forces and thereby avoid disengagement of the drive chain from the chain ring.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A chain guide apparatus for use on a bicycle drive system having a pedal crank, a chain ring rotated thereby, a frame supporting the pedal crank and a drive chain engaging the chain ring, said chain guide apparatus comprising:

a guide support plate and means for supporting said guide support plate upon a bicycle frame and pedal crank;

an upper guide block supported by said guide support plate and having a first guide channel formed therein having a first closed passage for receiving the bicycle drive chain passing through said first closed passage; and a lower guide block supported by said guide support plate and having a second guide channel formed therein having a second closed passage for receiving the bicycle drive chain passing through said second closed passage, said upper guide block constructed to guide a bicycle drive chain toward a bicycle chain ring and said lower guide block constructed to guide the bicycle drive chain toward the bicycle chain ring, said upper and lower guide blocks maintaining drive chain engagement despite chain-whipping forces.

2. The chain guide apparatus set forth in claim 1 wherein said upper guide block includes:

a curved extended ramp having a first arcuate edge above said first closed passage of said first guide channel; and a first guide finger beneath said first guide channel defining a first supporting ramp.

3. The chain guide apparatus set forth in claim 2 wherein said lower guide block includes a second guide finger above said second guide channel defining a second supporting ramp.

4. The chain guide apparatus set forth in claim 2 wherein said upper guide block includes a pair of substantially mirror-image upper guide block portions joined to form said upper guide block.

5. The chain guide apparatus set forth in claim 3 wherein said lower guide block includes a pair of substantially mirror-image lower guide block portions joined to form said lower guide block.

6. A chain guide apparatus for guiding a drive chain comprising:

a generally planar guide support plate having an upper end and a lower end;

an upper guide block secured to said upper end and having a first chain guide channel having a first passage therein and an extending ramp above said first chain guide channel; and a lower guide block secured to said lower end and having a second chain guide channel having a second passage therein, said guide support plate constructed to support said upper and lower guide blocks upon the bicycle drive chain at positions which oppose chain-whipping movement of the drive chain.

7. The chain guide apparatus set forth in claim 6 wherein said upper guide block includes a generally curved extended ramp, above said first chain guide channel, having an arcuate lower edge.

\* \* \* \* \*